United States Patent [19]

Perkinson et al.

[11] Patent Number: 4,501,157
[45] Date of Patent: Feb. 26, 1985

[54] VORTEX SHEDDING FLOW MEASURING TRANSDUCER

[75] Inventors: Robert H. Perkinson, Somers; Brian G. Donnelly, West Suffield; Carl S. Dudash, Enfield, all of Conn.

[73] Assignee: United Technologies Corporation, Hartford, Conn.

[21] Appl. No.: 441,886

[22] Filed: Nov. 15, 1982

[51] Int. Cl.³ .............................................. G01F 1/32
[52] U.S. Cl. .................................................. 73/861.24
[58] Field of Search ............... 73/861.22, 861.24, 653, 73/655

[56] References Cited

U.S. PATENT DOCUMENTS

| | | | |
|---|---|---|---|
| 2,813,424 | 8/1952 | Liepmann et al. | 73/204 |
| 3,602,037 | 8/1971 | Neu | 73/293 X |
| 3,796,096 | 3/1974 | Sielaff et al. | |
| 3,961,185 | 6/1976 | Brokenshire et al. | 250/231 R |
| 4,011,754 | 3/1977 | Pitt | |
| 4,206,642 | 6/1980 | Bearcroft | |
| 4,248,098 | 2/1981 | Sawayama et al. | 73/861.24 |
| 4,307,618 | 12/1981 | James et al. | 73/861.21 |
| 4,359,637 | 11/1982 | Perren | 374/204 X |
| 4,414,471 | 11/1983 | Rines | 73/655 X |
| 4,472,022 | 9/1984 | Bearcroft et al. | 73/861.24 X |

FOREIGN PATENT DOCUMENTS 2105846  3/1983  United Kingdom ............ 73/861.22

OTHER PUBLICATIONS

"Vortex Shedding Fluid Flowmeter Using Optical Fibre Sensor", *Electronic Letters*, Mar. 1981, Lyle et al.

Primary Examiner—James L. Rowland
Assistant Examiner—Brian R. Tumm
Attorney, Agent, or Firm—John Swiatocha

[57] ABSTRACT

A digital vortex shedding flow measuring transducer (10) includes an optical conductor (20) cantilevered to a conduit (15) accommodating the flow and an optical receiver (35) which intercepts an optical signal from the conductor as the conductor vibrates in response to vortices shed therefrom due to fluid flow thereover.

2 Claims, 3 Drawing Figures

VORTEX SHEDDING FLOW MEASURING TRANSDUCER

TECHNICAL FIELD

This invention relates generally to transducers for measuring fluid flow and more particularly to digital vortex shedding fluid flow measuring transducers.

BACKGROUND ART

It has been long known that a bluff (unstreamlined) body disposed within a fluid stream sheds vortices from itself under the principles of the von Karman vortex trail phenomenon. Such vortex shedding is the result of the formation of fluid boundary layers along the outer surface of the body. The lack of streamlining of the body prevents the flow in the boundary layers from following the contour of the body and the flow detaches itself from the body and rolls itself into a series of vortices. The vortices are shed alternately on opposite sides of the body in a periodic manner, the ensuing flow pattern consisting of a spatially oscillating trail of vortices otherwise known as a von Karman vortex trail. It has also been long known that such vortex shedding is related to the magnitude of the flow responsible therefor. In the case of a cylinder placed in a fluid stream, vortex shedding occurs at a frequency proportional to the flow velocity and inversely proportional to the cylinder diameter, the frequency being expressed as:

$$N = S(V/D)$$

wherein:

N is the frequency at which the vortices detach themselves from one side of the cylinder;

V is the free stream velocity of the fluid flow;

D is the diameter of the cylinder; and

S is the Strouhal Number which is generally constant over a wide range of Reynolds Numbers.

The prior art is replete with fluid flow measuring transducers which seek to provide signals indicative of flow velocity by measuring the frequency at which vortices are shed from a blunt body. Numerous schemes have been proposed for indirectly detecting vortices for the measurement of vortex shedding frequency and hence flow rate. Some of these schemes include detecting vortices by detecting thermal fluctuations of a heated wire in the flow stream, detecting the modulation of an ultrasonic beam in the flow stream, detecting pressure pulses associated with vortex shedding using piezoelectric pressure sensors, the magnetic sensing of the displacement of a metallic shuttle, capacitive detection of the displacement of a flexible membrane and strain guage detection of forces on a tail piece disposed in the flow. For one reason or another, such arrangements for detecting vortices have met with only limited success. For example, flow meters employing sensors sensitive to electromagnetic interference are often unusable in an environment such as within an aircraft or within an industrial environment characterized by high levels of ambient electrical noise.

To overcome some of the shortcomings of the hereinabove mentioned and other prior art vortex shedding flow meters, flow meters which optically detect the presence of vortices in the flow have been introduced. Such optical vortex shedding flow meters have sought to detect the presence of vortices as, for example, by detecting the modulation by vortices of a light beam through the flow, detecting the modulation of the refractive index of the fluid resulting from the presence of vortices therein and detecting the modulation of a light beam by a body which vibrates as a result of vortices acting thereon. These optical flow meters have also met with only limited acceptance. Various of those optical flow meters which rely on the vortex itself to modulate a light beam may, under certain circumstances, not be sufficiently accurate. Those flow meters which rely on a vibratory body to modulate a light beam may be insufficiently reliable and maintainable due to, for example, rapid wear of guides, stops or other means for limiting the movement of the body.

Generally, any flow meter which indirectly detects the presence of vortices, either optically or otherwise, is subject to noise in the fluid stream which adversely effects the accuracy and sensitivity of the meter.

DISCLOSURE OF INVENTION

Therefore, among the objects of the present invention is the provision of a vortex shedding flow measuring transducer characterized by enhanced sensitivity, accuracy and maintainability as well as enhanced economy of construction and manufacturing cost.

In accordance with the present invention, vortices in a fluid flow are directly detected and hence, flow rate is measured by a digital, optical fluid flow measuring transducer employing a single optical transmitter which both transmits an optical signal to the interior of the transducer and modulates that signal in response to the shedding of vortices form itself. In the preferred embodiment, the optical transmitter comprises an optical fiber cantilevered from a conduit which accommodates the flow of fluid through the transducer and establishes a uniform flow velocity, profile. An optical receiver comprising, for example, a second optical fiber is disposed within the conduit and aligned with the first optical fiber under conditions of fluid stagnation or negligible flow. Vortex shedding as a result of flow over the surface of the transmitter vibrates the transmitter, such vibration causing periodic interruptions in the reception of the optical signal from the transmitter by the receiver. Suitable detection circuitry (not part of the present invention) is connected to the receiver for providing a read-out of the frequency of the signal and therefore an indication of the velocity of flow through the transducer.

BEST MODE FOR CARRYING OUT THE INVENTION AND INDUSTRIAL APPLICABILITY

Figure 1:
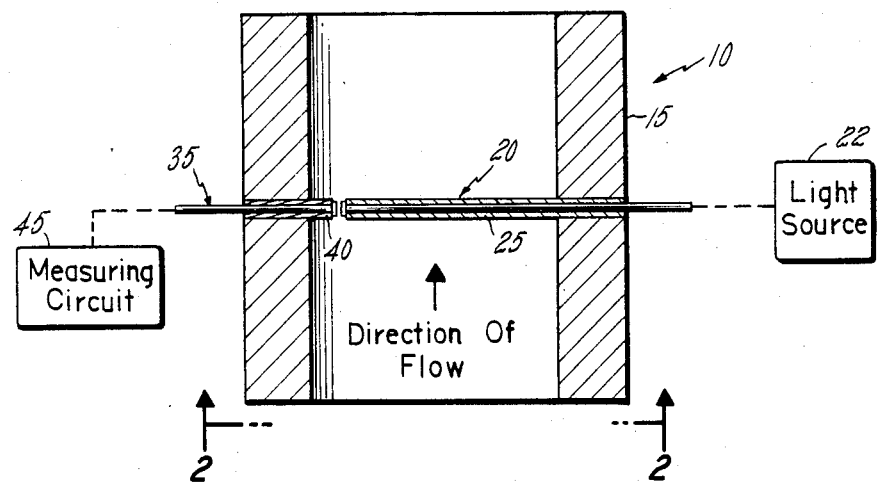
FIG. 1 is a partially sectioned elevation of the flow measuring transducer of the present invention.

Referring to the drawings, the digital flow measuring transducer of the present invention is shown generally at 10 and comprises a conduit 15 which accommodates the flow therethrough of a fluid, the velocity of which is measured by the transducer. The cross section of the conduit is such that a uniform velocity profile of the fluid is achieved. Cantilevered to conduit 15 is a blunt conducting means (transmitter) 20 which vibrates in response to the shedding of a von Karman vortex trail therefrom due to fluid flow thereover. Conductor 20 is adapted for connection to a light source 22, a continuous light signal being transmitted from the source along the length of the conductor. In the preferred embodiment, the conductor comprises an optical fiber of any suitable known material. Optical conductor 20 is provided on the lateral surface thereof with an opaque coating 25 of such material as aluminum or chromium. The opaque coating is continued from the lateral surface of the optical conductor over a portion of the free end thereof, exposing a slit aperture (window) 30 in the free end to allow for the emission of a light signal therefrom. The slit aperture effectively reduces the threshold vibratory amplitude of the optical conductor required for detection of vortex shedding by means described below for receiving the optical signal from conductor 20.

A means 35 for receiving the optical signal emitted by conductor 25 is disposed within the conduit in alignment with the conductor (when at rest) and is spaced slightly therefrom to allow unrestricted vibratory movement of the conductor. Like conductor 25, in the preferred embodiment, receiving means 35 comprises an optical fiber of any of the known materials listed hereinabove including on the lateral surface thereof an opaque coating 40 such as the hereinabove noted aluminum or chromium coatings or any other suitable opaque material. Coating 40 like coating 25, extends over a portion of the free end of the receiver exposing a slit aperture window substantially identical in size and shape to window 30 in conductor 25 and in alignment therewith. The receiver is connected to a suitable measuring circuit 45 which counts light pulses received from receiving means 35, providing a read-out of the measured frequency. The details of measuring circuit 45 are well known in the art and therefore, are not given herein. For example, circuit 45 may comprise any of a variety of known pulse repetition frequency meters and may include circuitry therein for direct conversion of the pulsed light signal to a read-out of fluid flow velocity in accordance with the relationship between these properties set forth hereinabove.

Figure 2:
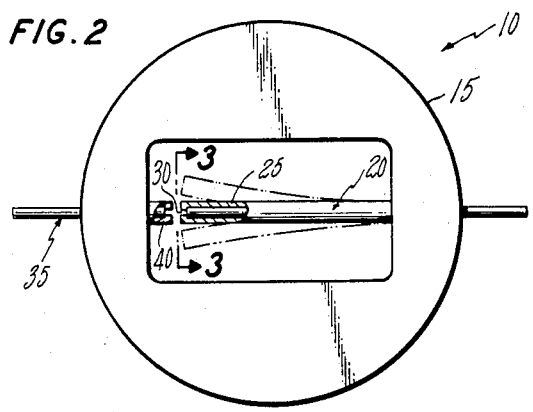
FIG. 2 is an end view of the flow measuring transducer taken in the direction of line 2—2 of FIG. 1, portions of the transducer being broken away to show details of the construction thereof.
Figure 3:
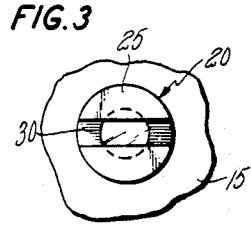
FIG. 3 is an end view taken in the direction of line 3—3 of FIG. 2 of an optical conductor employed in the transducer of the present invention.

In operation, flow through conduit 15 over the surface of conductor 25 causes the formation and subsequent shedding of vortices therefrom in the manner set forth hereinabove. As a vortex is formed on one side of the conductor, a pressure imbalance resulting therefrom produces a lateral force on the conductor which causes the conductor to deflect vertically as shown in FIG. 2. As set forth hereinabove, vortex shedding occurs alternately on opposite sides of such a blunt body and the resulting pressure imbalances cause alternating upward and downward vibratory deflections of conductor 20 as shown in phantom lines in FIG. 2.

It will be seen that a continuous light beam from source 22 emitted from the end of conductor 25 will, as a result of the vibratory deflections of the conductor, intermittently impinge upon the end of receiver 35, the receiver providing the now modulated light signal to the measuring circuit 45 which computes the frequency of the modulated light signal and hence the velocity of the flow.

It will be appreciated from the foregoing that the provision of cantilevered conductor 25 which both conducts a light signal to the interior of the flow meter and modulates the signal in response to vortex shedding therefrom, serves to minimize the number of component parts required for the flow meter. Such minimization, as those skilled in the art can well appreciate, enhances the simplicity, reliability, maintainability and economy of the flow meter. The slit apertures in the ends of the conductor and receiver allow minimal vibratory response to vortex shedding by the conductor to provide a detectable modulated light signal indicative of flow velocity.

While a preferred embodiment of the present invention has been shown, it will be appreciated by those skilled in the art that various modifications may be made without departing from this invention. For example, while specific materials have been mentioned, alternate equivalent materials may be employed with equal utility. Also, while the receiver and conductor are shown longitudinally (with respect to conduit 15) aligned during stagnant or low flow conditions, it will be appreciated that the receiver may be located slightly downstream from the conductor to allow for normal bending of the conductor due to impingement of the flow thereon. Furthermore, while conduits and optical fibers having a round cross section are shown, various other shapes and configurations may be employed.

Having thus described the invention, what is claimed is:

1. A digital flow measuring transducer comprising a conduit for accommodating a flow of fluid therethrough, said transducer being characterized by:
   a first optical fiber cantilevered to a wall of said conduit, said first optical fiber conducting a continuous optical signal from the exterior of said conduit to the interior thereof, flow past said first optical fiber inducing the periodic formation and shedding of vortices therefrom, said vortex shedding causing a vibration of said first optical fiber; and
   a second optical fiber disposed in said conduit and spaced from said first optical fiber for receiving said optical signal after a modulation thereof by said first optical fiber, said second optical fiber being periodically aligned with said first optical fiber as a result of the vibration thereof to effect said modulation of said signal at said second optical fiber, the frequency of said modulated signal being indicative of the rate at which said vortices are shed from said first optical fiber and the rate of fluid flow through said conduit;
   said first and second optical fibers at adjacent ends thereof being optically opaque with the exception of aligned transparent slit apertures therein, the transmission of said optical signal from the slit aperture of said first optical fiber to the slit aperture of said second optical fiber effectively reducing the threshold vibratory amplitude of said first optical fiber required for detection of said vortex shedding by said flow measuring transducer.

2. The digital flow measuring transducer of claim 1 characterized by said first and second optical fibers being provided on lateral surfaces thereof wth opaque coatings.

* * * * *